US006457898B1

(12) United States Patent
Donovan et al.

(10) Patent No.: US 6,457,898 B1
(45) Date of Patent: Oct. 1, 2002

(54) ULTRASONIC TRANSDUCER CONNECTOR ASSEMBLY

(75) Inventors: James M. Donovan, Liberty Township; Patrick J. Howard, Cincinnati, both of OH (US)

(73) Assignee: General Electric Company, Schenectady, NY (US)

( * ) Notice: Subject to any disclaimer, the term of this patent is extended or adjusted under 35 U.S.C. 154(b) by 4 days.

(21) Appl. No.: 09/670,188

(22) Filed: Sep. 26, 2000

(51) Int. Cl.[7] .................................................. F16B 7/02
(52) U.S. Cl. ....................................... 403/165; 403/362
(58) Field of Search .......................... 403/87, 164, 165, 403/362, 84, 88, 89

(56) References Cited

U.S. PATENT DOCUMENTS

| | | | | | |
|---|---|---|---|---|---|
| 933,625 | A | * | 9/1909 | Clarkson | 403/164 X |
| 1,337,205 | A | * | 4/1920 | Dingman | 403/165 X |
| 3,347,110 | A | * | 10/1967 | Wilson | 403/362 X |
| 3,741,595 | A | * | 6/1973 | Horgan, Jr. | 403/84 X |
| 3,980,408 | A | * | 9/1976 | Jachmann | 403/362 X |
| 4,756,639 | A | * | 7/1988 | Hoshino | 403/362 X |
| 5,536,097 | A | * | 7/1996 | Hazan | 403/362 X |
| 5,556,223 | A | * | 9/1996 | Fabel | 403/362 |

FOREIGN PATENT DOCUMENTS

| | | | | |
|---|---|---|---|---|
| GB | 748380 | * | 5/1956 | 403/362 |

* cited by examiner

*Primary Examiner*—Lynne H. Browne
*Assistant Examiner*—John R. Cottingham
(74) *Attorney, Agent, or Firm*—V. Ramaswamy

(57) ABSTRACT

A connector assembly for connecting an ultrasonic transducer to a transducer fixture of an ultrasonic inspection system. The assembly includes a male connector element including a protrusion having a circular cross section and a mount for connecting the male element to at least one of the transducer and the transducer fixture. The assembly also includes a female connector element including a recess sized and shaped for rotatably receiving the male element protrusion to releasably connect the male connector element to the female connector element and a mount for connecting the female element to at least one of the transducer and the transducer fixture. In addition, the assembly includes a fastener mounted on at least one of the male and female connector elements for releasably fastening the male connector element to the female connector element to retain the male element protrusion in the female element recess and to prevent the male element from rotating with respect to the female element.

11 Claims, 2 Drawing Sheets

ULTRASONIC TRANSDUCER CONNECTOR ASSEMBLY

BACKGROUND OF THE INVENTION

The present invention relates generally to ultrasonic inspection systems, and more particularly to a connector assembly for connecting an ultrasonic transducer to a transducer fixture.

Ultrasonic inspection systems such as those used to inspect aircraft engine components include a transducer mounted on a transducer fixture of a positioning system. The fixture or "search tube" moves the transducer over the component being inspected as the transducer delivers an ultrasonic signal to the component and detects changes in the ultrasonic signal as the signal travels through the component. The changes can be analyzed using conventional techniques to determine whether or not flaws are present in the component. Such inspection systems and techniques are conventional and well-known in the art.

Typically in the past, transducers were connected to transducer fixtures with a one-piece connector having a male connector element and a female connector element at opposite ends of the connector. For example, one such male connector element is a cylindrical protrusion having a ⅝ inch diameter, UHF-type thread, and one such female connector element is a cylindrical recess having a ⅝ inch diameter, UHF-type thread. The male connector element is screwed into a threaded hole in the transducer fixture, and the female connector element is screwed onto a threaded protrusion extending from the transducer. Regardless of whether the connector is first attached to the transducer or to the transducer fixture, at some stage during the connection of the transducer to the fixture, the transducer must be rotated relative to the fixture. Although electrical signals are delivered to and from some transducers through the UHF connector, other types of transducers such as transducers having multiple elements or low noise requirements rely on cables connected directly to the transducer apart from the connector for transmitting electrical signals. Rotating the transducer with respect to the fixture twists and tangles the electrical cables connected to the transducer for delivering electrical signals to and from the transducer.

In addition, the signal sensitivity of some transducers (e.g., multiple element or compound lens transducers) is affected by the rotational position of the transducer relative to the component. Because conventional connectors have screw threads at each end, the rotational position of the transducer with respect to the transducer fixture (and thus to the component) varies. Although the rotational position of the transducer can be adjusted somewhat, it is not fully adjustable. Moreover, the rotational position can be disturbed if the connector is not tightly screwed onto the transducer and into the transducer fixture. Therefore, the optimal position of the transducer relative to the component may not be achieved or maintained using conventional transducer connectors.

SUMMARY OF THE INVENTION

Among the several features of the present invention may be noted the provision of a connector assembly for connecting an ultrasonic transducer to a transducer fixture of an ultrasonic inspection system. The assembly comprises a male connector element including a protrusion having a circular cross section and a mount for connecting the male element to at least one of the transducer and the transducer fixture. The assembly also comprises a female connector element including a recess sized and shaped for rotatably receiving the male element protrusion to releasably connect the male connector element to the female connector element and a mount for connecting the female element to at least one of the transducer and the transducer fixture. In addition, the assembly comprises a fastener mounted on at least one of the male and female connector elements for releasably fastening the male connector element to the female connector element to retain the male element protrusion in the female element recess and to prevent the male element from rotating with respect to the female element.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
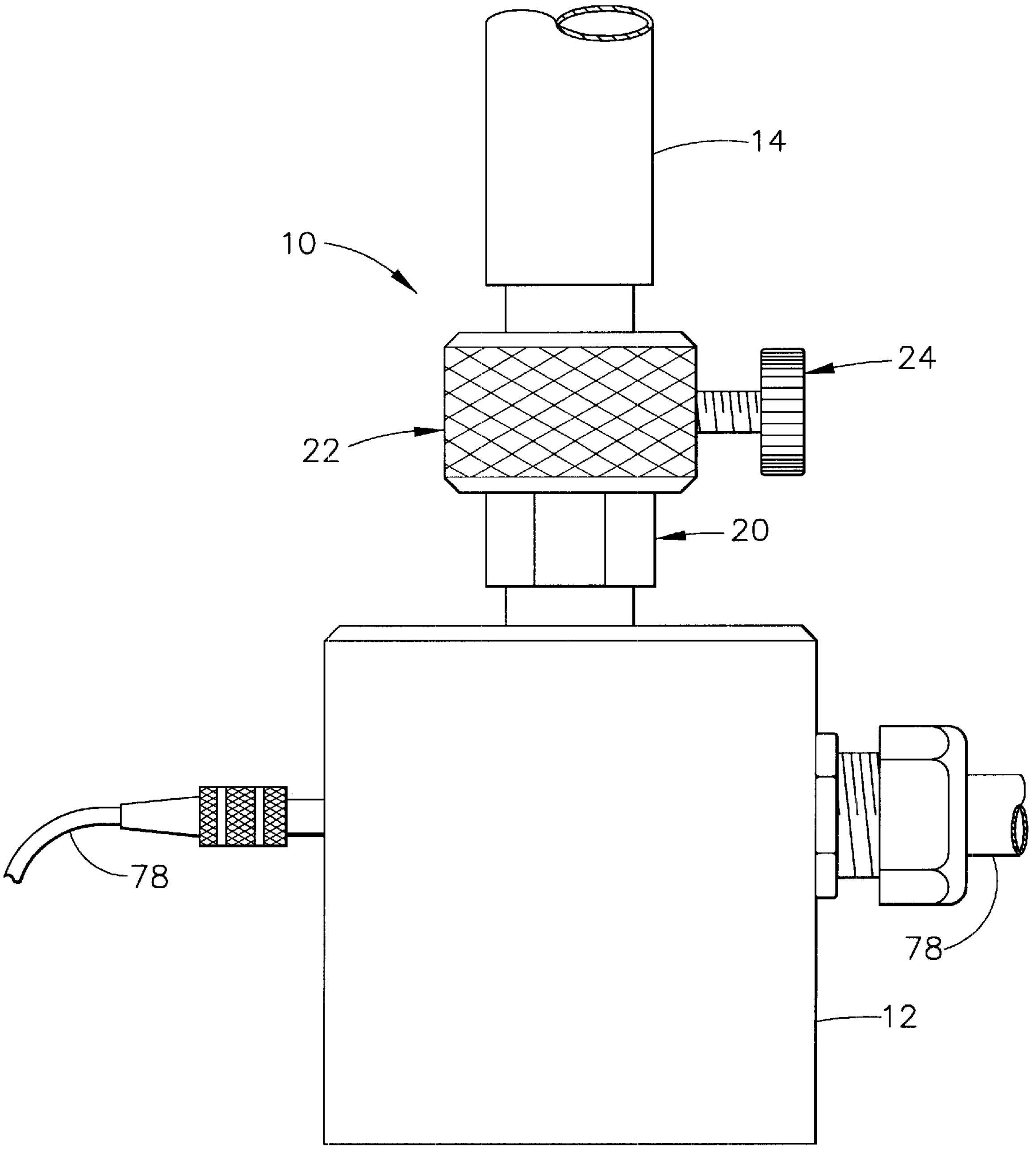
FIG. 1 is a front elevation of a portion of an ultrasonic inspection system showing a transducer connected to a transducer fixture using a connector assembly of the present invention.

Referring to the drawings, and more particularly to FIG. 1, a connector assembly of the present invention is designated in its entirety by the reference numeral 10. The connector assembly 10 is used for connecting an ultrasonic transducer 12 to the transducer fixture 14 of an ultrasonic inspection system. Because the transducer 12 and transducer fixture 14 are conventional, they will not be described in detail. The connector assembly 10 generally comprises a male connector element (generally designated by 20), a female connector element (generally designated by 22), and a fastener (generally designated by 24).

Figure 3:
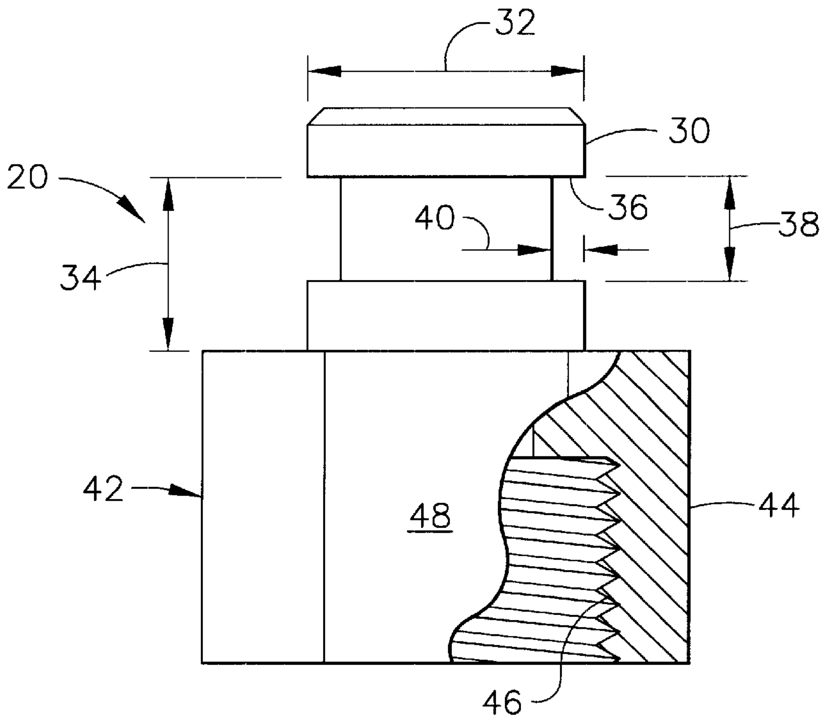
FIG. 3 is a front elevation in partial section of a male connector element of the connector assembly.

As illustrated in FIG. 3, the male connector element 20 includes a generally cylindrical protrusion 30 having a circular cross-section. Although the protrusion 30 may have other dimensions without departing from the scope the present invention, in one embodiment the protrusion has a diameter 32 of about ½ inch and a length 34 of about 7/16 inch. A groove 36 extends circumferentially around the protrusion 30. Although the groove 36 may have other dimensions without departing from the scope the present invention, in one embodiment the groove has a width 38 of about 3/16 inch and a depth 40 of about 1/16 inch. The male connector element 20 also includes a mount, generally designated by 42, formed integrally with the protrusion 30 for connecting the male element to the transducer 12. Although the mount 42 of the male connector element 20 may have other configurations without departing from the scope of present invention, in one embodiment the mount comprises a body 44 having a threaded recess 46 therein sized for connecting the male element to the transducer 12. For example, in one embodiment the male element mount 42 is a ⅝ inch diameter, UHF-type female connector. Although a UHF-type connector is used, no electronic cables or wiring passes through the male connector element 20. Flat lands 48 are included on the mount 42 for tightening the male element 20 onto the transducer 12 with a wrench (not shown).

Although the male connector element 20 may be made of other materials without departing from the scope of the present invention, in one embodiment the element is made of brass.

Figure 2:
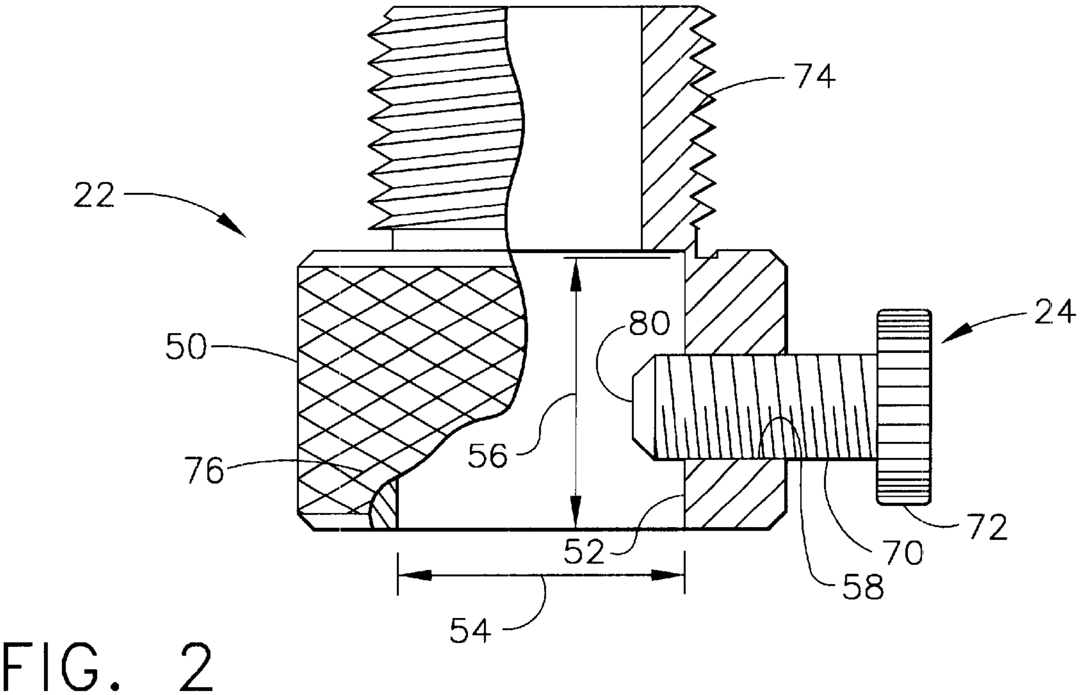
FIG. 2 is a front elevation in partial section of a female connector element of the connector assembly of the present invention.

As illustrated in FIG. 2, the female connector element 22 comprises a generally cylindrical body 50 having a generally cylindrical recess 52 sized and shaped for rotatably receiving the male element protrusion 30. Although the recess 52 may have other dimensions without departing from the scope the present invention, in one embodiment the recess has a diameter 54 of about 33/64 inch and a depth 56 of about ½ inch. A threaded hole 58 extends through the body 50 of the female connector element 22 to the recess 52. The hole 58 is aligned with the groove 36 in the male element protrusion 30 when the protrusion is seated in the recess 52. The fastener 24 is rotatably received in the threaded hole 58. Although the fastener 24 may have other configurations without departing from the scope the present invention, in one embodiment the fastener 24 is a screw fastener having a 10-32 threaded stainless steel shank 70 and a plastic head 72 configured for grasping by the user to tighten the rod against the protrusion 30 of the male connector element 20. The female connector element 22 also includes a mount 74 for connecting the female element to the transducer fixture 14. Although the mount 74 of the female connector element 22 may have other configurations without departing from scope the present invention, in one preferred embodiment the mount is a threaded connector formed integrally with the body 50 and of the female connector and sized for connecting the female element to the transducer fixture 14. For example, in one embodiment the female element mount 74 is a ⅝ inch diameter, UHF-type male connector. Although the UHF-type connector is used, no electronic cables or wiring passes through the female connector element 22. Although the female connector element 22 may be made of other materials without departing from the scope of the present invention, in one embodiment the element is made of brass. The body 50 of the female connector element 22 may include knurling 76 for use when tightening the element onto the fixture 14.

As will be appreciated by those skilled in the art, the fastener 24 of the described embodiment is selectively movable between three positions. In a first position referred to as a "capture position", the fastener 24 retains the male element protrusion 30 in the female element recess 52. However, the male element 20 is free to rotate with respect to the female element 22 when the fastener 24 is in the capture position so the position of the transducer 12 relative to the fixture 14 can be adjusted. In a second position referred to as a "lock position", the fastener 24 is tightened against the male element protrusion 30 in the female element recess 52 to prevent the male element 20 from rotating with respect to the female element 22. In a third position referred to as a "release position", the fastener 24 is clear of the groove 36 so the male element protrusion 30 can be removed from the female element recess 52 to permit the transducer 12 to be disconnected from the fixture 14.

To use the connector assembly 10 described above, the male connector element 20 is screwed onto a threaded portion of the transducer 12, and the female connector element 22 is screwed into a threaded portion of the transducer fixture 14. As the male connector element 20 and female connector element 22 are attached to the corresponding parts of the ultrasonic inspection system, neither the transducer 12 nor transducer fixture 14 need be rotated. Thus, electrical cables 78 (FIG. 1) connected to the transducer 12 do not become tangled or twisted as the elements 20, 22 are installed. To attach the transducer 12 to the transducer fixture 14, the male element protrusion 30 is inserted into the female element recess 52. The fastener 24 is moved to the capture position in which an inner end 80 of the fastener is positioned in the groove 36 of the male element 20 but does not tightly engage the protrusion 30. When in this position, the transducer 12 may be rotated with respect to the transducer fixture 14 to achieve the desired signal properties from the transducer as will be understood by those skilled in the art. Generally when performing this calibration step, the system is energized and the transducer is brought into the vicinity of an inspection standard such as a flat metal plate. The signals obtained from the transducer 12 are examined as the transducer is rotated. When the signals are maximized, the fastener 24 is tightened to the lock position so that the inner end 80 of the fastener engages the male element 20 to prevent further rotation of the transducer 12. The ultrasonic inspection system may then be used in a conventional manner.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. In combination, an ultrasonic transducer, a transducer fixture, and a connector assembly for connecting the ultrasonic transducer to the transducer fixture of an ultrasonic inspection system, said assembly comprising:

a male connector element including a protrusion having a circular cross section, a circumferential groove extending around the protrusion and a mount adapted for connecting the male element to at least one of the transducer and the transducer fixture;

a female connector element including a recess sized and shaped for rotatably receiving the male element protrusion to releasably connect the male connector element to the female connector element and a mount adapted for connecting the female element to at least one of the transducer and the transducer fixture; and a fastener mounted on at least one of the male and female connector elements for releasably fastening the male connector element to the female connector element to retain the male element protrusion in the female element recess and to prevent the male element from rotating with respect to the female element.

2. A connector assembly as set forth in claim 1 wherein the fastener is selectively moveable between a capture position in which the male element protrusion is retained in the female element recess and the male element is free to rotate with respect to the female element to permit adjustment of an angular position of the transducer with respect to the fixture, a lock position in which the male element protrusion is retained in the female element recess and the male element is prevented from rotating with respect to the female element to maintain the position of the transducer with respect to the fixture, and a release position in which the male element protrusion is removable from the female element recess to disconnect the transducer from the fixture.

3. A connector assembly as set forth in claim 2 wherein the circumferential groove extending around the protrusion is adapted for receiving the fastener when in the capture position and the lock position.

4. A connector assembly as set forth in claim 3 wherein the female connector element includes a threaded hole which extends through the female element to the recess and which is aligned with the male element groove when the protrusion is received in the recess, and wherein the fastener is a screw fastener rotatably received in the threaded hole.

5. A connector assembly as set forth in claim 1 wherein the male element mount is adapted for connecting the male element to the transducer.

6. A connector assembly as set forth in claim 5 wherein the male element mount includes a threaded connector sized for connecting the male element to the transducer.

7. A connector assembly as set forth in claim 5 wherein the male element threaded connector is a ⅝ inch UHF connector.

8. A connector assembly as set forth in claim 1 wherein the female element mount is adapted for connecting the female element to the transducer fixture.

9. A connector assembly as set forth in claim 8 wherein the female element mount includes a threaded connector sized for connecting the female element to the transducer fixture.

10. A connector assembly as set forth in claim 9 wherein the female element threaded connector is a ⅝ inch UHF connector.

11. A method of using a connector assembly comprising a male connector element including a protrusion having a circular cross section, a circumferential groove extending around the protrusion and a mount adapted for connecting the male element to at least one of the transducer and the transducer fixture, a female connector element including a recess sized and shaped for rotatably receiving the male element protrusion to releasably connect the male connector element to the female connector element and a mount adapted for connecting the female element to at least one of the transducer and the transducer fixture, and a fastener mounted on at least one of the male and female connector elements for releasably fastening the male connector element to the female connector element to retain the male element protrusion in the female element recess and to prevent the male element from rotating with respect to the female element, said method comprising the steps of:

connecting the male connector element to the transducer;

connecting the female connector element to the transducer fixture;

inserting the male element protrusion in the female element recess;

rotating the transducer with respect to the transducer fixture to achieve desired signal properties from the transducer; and adjusting the fastener when the desired signal properties are achieved to prevent the male element from rotating with respect to the female element.

* * * * *